(12) United States Patent
Lull et al.

(10) Patent No.: US 6,941,965 B2
(45) Date of Patent: Sep. 13, 2005

(54) METHOD AND APPARATUS FOR PROVIDING A DETERMINED RATIO OF PROCESS FLUIDS

(75) Inventors: John M. Lull, Claremont, CA (US); William S. Valentine, Irvine, CA (US)

(73) Assignee: Celerity, Inc., Austin, TX (US)

( * ) Notice: Subject to any disclaimer, the term of this patent is extended or adjusted under 35 U.S.C. 154(b) by 0 days.

(21) Appl. No.: 10/832,949

(22) Filed: Apr. 27, 2004

(65) Prior Publication Data

US 2004/0200529 A1 Oct. 14, 2004

Related U.S. Application Data

(62) Division of application No. 10/154,433, filed on May 23, 2002, now Pat. No. 6,752,166.
(60) Provisional application No. 60/293,356, filed on May 24, 2001.

(51) Int. Cl.[7] .......................... G05D 11/13; G05D 7/06
(52) U.S. Cl. ..................... 137/9; 137/487.5; 137/597; 137/883; 137/2; 137/12; 118/715
(58) Field of Search ............................ 137/9, 12, 14, 137/486, 487.5, 624.11; 251/129.05; 118/715; 700/282

(56) References Cited

U.S. PATENT DOCUMENTS

| | | | |
|---|---|---|---|
| 2,676,603 A | 4/1954 | Kollsman | |
| 4,065,250 A | 12/1977 | Schliefer et al. | |
| 4,345,610 A | 8/1982 | Herter | |
| 4,369,031 A | * 1/1983 | Goldman et al. | 432/198 |
| 4,949,670 A | 8/1990 | Krogh | |
| 5,013,398 A | 5/1991 | Long et al. | |
| 5,134,965 A | 8/1992 | Tokuda et al. | |
| 5,415,728 A | 5/1995 | Hasegawa et al. | |
| 5,453,124 A | * 9/1995 | Moslehi et al. | 118/715 |
| 5,522,934 A | 6/1996 | Suzuki et al. | |
| 5,614,055 A | 3/1997 | Fairbairn et al. | |
| 5,662,143 A | 9/1997 | Caughran | |
| 5,702,530 A | 12/1997 | Shan et al. | |
| 5,736,457 A | 4/1998 | Zhao | |
| 5,772,771 A | 6/1998 | Li et al. | |
| 5,865,205 A | 2/1999 | Wilmer | |
| 5,911,834 A | 6/1999 | Fairbairn et al. | |
| 5,916,369 A | 6/1999 | Anderson et al. | |
| 5,951,772 A | 9/1999 | Matsuse et al. | |
| 5,997,950 A | 12/1999 | Telford et al. | |
| 6,012,474 A | 1/2000 | Takamoto et al. | |
| 6,013,155 A | 1/2000 | McMillin et al. | |
| 6,042,687 A | 3/2000 | Singh et al. | |
| 6,068,729 A | 5/2000 | Shrotriya | |
| 6,083,569 A | 7/2000 | Gupta et al. | |
| 6,125,859 A | 10/2000 | Kao et al. | |
| 6,162,323 A | 12/2000 | Koshimizu | |

(Continued)

FOREIGN PATENT DOCUMENTS

| | | | |
|---|---|---|---|
| JP | 358151614 A | * | 9/1983 |
| WO | WO 00/31602 | | 6/2000 |

*Primary Examiner*—Ramesh Krishnamurthy
(74) *Attorney, Agent, or Firm*—Lowrie, Lando & Anastasi, LLP

(57) ABSTRACT

A fluid flow control system that includes a fluid inlet to receive a flow of process fluid and a plurality of fluid outlets. The plurality of fluid outlets include a first fluid outlet and at least one second fluid outlet. The first fluid outlet provides a first predetermined portion of the flow of process fluid, and the at least one second fluid outlet provides the remaining portion of the flow of process fluid. In one embodiment, the control system includes a pressure transducer, first and second multipliers, and first and second flow controllers. The first multiplier multiplies a pressure signal received from the pressure transducer by a first setpoint to control a first flow controller that provides the first predetermined portion of the flow of process fluid. The second multiplier multiplies the pressure signal by a second setpoint to control a second flow controller that provides the remaining portion.

17 Claims, 7 Drawing Sheets

U.S. PATENT DOCUMENTS

| | | |
|---|---|---|
| 6,190,233 B1 | 2/2001 | Hong et al. |
| 6,210,482 B1 | 4/2001 | Kitayama et al. |
| 6,217,659 B1 | 4/2001 | Botelho et al. |
| 6,217,937 B1 | 4/2001 | Shealy |
| 6,287,980 B1 | 9/2001 | Hanazaki et al. |
| 6,294,026 B1 | 9/2001 | Roithner et al. |
| 6,321,782 B1 | 11/2001 | Hollister |
| 6,333,272 B1 * | 12/2001 | McMillin et al. ........... 438/710 |
| 6,360,762 B2 | 3/2002 | Kitayama et al. |
| 6,389,364 B1 * | 5/2002 | Vyers ........................ 702/45 |
| 6,418,954 B1 | 7/2002 | Taylor et al. |
| 6,422,264 B2 | 7/2002 | Ohmi et al. |
| 6,508,913 B2 | 1/2003 | McMillin et al. |
| 6,532,978 B1 | 3/2003 | Müller-Kuhrt |
| 6,581,623 B1 | 6/2003 | Carpenter |
| 6,631,334 B2 | 10/2003 | Grosshart |
| 2002/0042205 A1 | 4/2002 | McMillin et al. |

\* cited by examiner

METHOD AND APPARATUS FOR PROVIDING A DETERMINED RATIO OF PROCESS FLUIDS

CROSS REFERENCE TO RELATED APPLICATIONS

This application is a continuation under 35 U.S.C. §120 of commonly-owned, U.S. patent application Ser. No. 10/154,433, now U.S. Pat. No. 6,752,166 B2, entitled "METHOD AND APPARATUS FOR PROVIDING A DETERMINED RATIO OF PROCESS FLUIDS," filed May 23, 2002, which claims priority to U.S. provisional patent application Ser. No. 60/293,356, entitled "METHOD AND APPARATUS FOR PROVIDING A DETERMINED RATIO OF PROCESS FLUIDS," filed May 24, 2001, each of which is incorporated herein by reference in its entirety.

The present invention is directed to fluid processing systems, and more particularly to a fluid processing system that is capable of providing a plurality of process fluid flows, each providing a predetermined amount of process fluid relative to a total flow of process fluid.

Fluid processing systems are used in the semiconductor and pharmaceutical industries (as well as in other industries) to provide a precise quantity of fluid or fluids to a processing chamber. For example, in the semiconductor industry, fluid processing systems may be used to provide precisely metered quantities of fluid or fluids to a semiconductor wafer processing chamber. In a typical fluid processing system, each of a plurality of fluid supplies are respectively coupled to a mass flow controller that is capable of providing a precisely metered amount of fluid to a common manifold. The common manifold is fluidly coupled to an inlet of the process chamber. Conventionally, the process chamber has only a single inlet to receive the flow of process fluids from the common manifold.

SUMMARY OF THE INVENTION

According to an aspect of the present invention, a fluid processing system is provided that can receive a first amount of fluid and provide a plurality of second amounts of the fluid to a plurality of fluid outlets, with each of the plurality of second amounts of the fluid having a predetermined ratio relative to the first amount of the fluid.

According to one embodiment, a fluid flow controller is provided. The fluid flow controller comprises a fluid inlet to receive a flow of process fluid and a plurality of fluid outlets to provide the flow of process fluid to a plurality of device inlets. The plurality of fluid outlets include a first fluid outlet and at least one addition fluid outlet. The fluid flow controller further comprises a first input to receive a first signal indicative of an amount of the process fluid that is received at the fluid inlet, and a second input to receive a second signal indicative of a first predetermined portion of the amount of the process fluid that is to be provided to the first fluid outlet, with a remaining portion of the amount of process fluid being provided to the at least one additional fluid outlet.

According to another embodiment of the present invention, a fluid flow control system is provided that includes a fluid inlet to receive a flow of process fluid and a plurality of fluid outlets. The plurality of fluid outlets include a first fluid outlet and at least one second fluid outlet, the first fluid outlet providing a first predetermined portion of the flow of process fluid, and the at least one second fluid outlet providing a remaining portion of the flow of process fluid.

According to another embodiment of the present invention, a method of controlling a flow of process fluid is provided. The method includes acts of receiving the flow of process fluid at a fluid inlet, providing a first predetermined portion of the flow of process fluid to a first fluid outlet, and providing a remaining portion of the flow of process fluid to at least one second fluid outlet.

According to a further embodiment of the present invention, a fluid flow controller is provided. The fluid flow controller comprises a first input to receive a first signal indicative of an amount of process fluid received at a fluid inlet, a second input to receive a second signal indicative of a first predetermined portion of the received amount of the process fluid, and a first multiplier. The first multiplier receives the first signal and the second signal, multiplies the first signal by the second signal, and provides a first multiplied signal indicative of the first predetermined portion of the amount of process fluid, independent of the amount of the process fluid received at the fluid inlet.

DETAILED DESCRIPTION

As used herein, the term fluid is used to refer to fluids in a liquid state, fluids in a gaseous state, and to slurries (e.g., fluids in a liquid state with solids suspended therein). Although embodiments of the present invention are primarily described herein in terms of the processing of fluids in a gaseous state (i.e., gases), it should be appreciated that the present invention is not so limited, and may be adapted for use with fluids in a liquid state, as well as to slurries. Further, it should be appreciated that the process fluids in use may be a single species of process fluid, or may be a mixture of different process fluid species.

Figure 1:
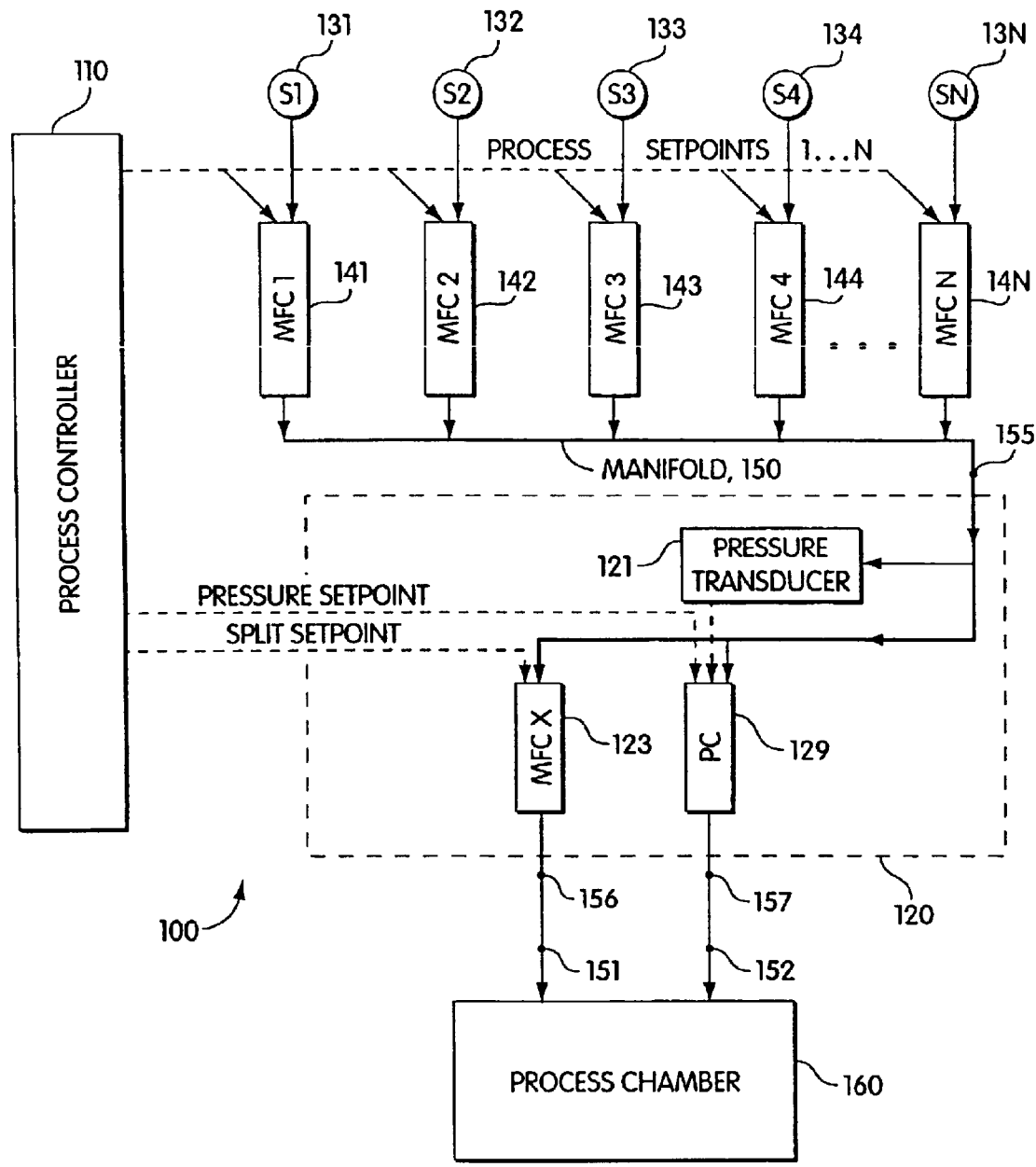
FIG. 1 illustrates a split ratio fluid process control system according to one embodiment of the present invention that is adapted to provide a predetermined flow of process fluid to a pair of fluid outlets.

FIG. 1 illustrates a split ratio fluid process control system according to one embodiment of the present invention that is adapted for use with fluids in a gaseous state. Modifications that may be made to this fluid process control system for use with other types of fluids, such as liquids are discussed further below.

According to one aspect of the present invention, the split ratio fluid process control system includes a split ratio controller having a fluid inlet and a plurality of fluid outlets. The split ratio controller is capable of receiving a flow of process fluid at the fluid inlet and providing a plurality of flows of the process fluid to each of the plurality of fluid outlets. Each of the plurality of flows of the process fluid may provide a predetermined amount of the process fluid.

As shown in FIG. 1, fluid processing system 100 includes a plurality of fluid supplies 131–13N (labeled S1–SN), each providing a process fluid or mixture of process fluids to a respective mass flow controller (MFC) 141–14N (labeled MFC1–MFCN). For example, fluid supply S1 could be Nitrogen, fluid supply S2 could be Argon, fluid supply S3 could be Helium, fluid supply S4 silane, etc. Each mass flow controller 141–14N receives a flow of fluid (or fluids) from its respective fluid supply and a setpoint from a process controller 110. Based upon the setpoint received from the process controller 110, each MFC 141–14N provides a metered amount of fluid to a common manifold 150. Details of a mass flow controller that may be suitably used accordance with embodiments of the present invention are described in U.S. patent application Ser. No. 10/131,603, filed Apr. 24, 2002, entitled SYSTEM AND METHOD FOR A MASS FLOW CONTROLLER, which is herein incorporated by reference in its entirety. The process controller 110 is programmed to control each of the MFCs 141–14N to provide various amounts of one or more of the fluids during each of a number of processing steps in a conventional manner.

Coupled to the common manifold 150 and the process controller 110 is a split ratio controller 120. The split ratio controller 120 has a fluid inlet 155 that is fluidly coupled to the common manifold 150 to receive a flow of process fluid or fluids from the common manifold 150, and a plurality of fluid outlets 156, 157. Each of the plurality of fluid outlets 156, 157 may be coupled to a respective fluid input 151, 152 of the process chamber 160 to provide a predetermined amount of fluid to the process chamber 160. According to one embodiment of the present invention, the split ratio controller may include a pressure transducer 121 that is fluidly coupled to the common manifold 150, a mass flow controller 123, and a pressure controller (P.C.) 129. The pressure transducer 121 provides a signal indicative of the pressure within the common manifold 150 to the pressure controller 129. The process controller 110 sends a pressure setpoint control signal to the pressure controller 129 that identifies the desired pressure within the common manifold 150. Typically the pressure setpoint provided by the process controller 110 is a fixed value during a given process step, although it may change from step to step or during a given processing step. In general, the value of the pressure setpoint will vary depending upon the chamber pressure of the process chamber 160. For example, at very low process chamber pressures, the pressure setpoint may be set to a value that is several times that of the process chamber to ensure an appropriate flow of process fluid or fluids in the mass flow controller 123 and the pressure controller 129. At higher process chamber pressures, a pressure difference of approximately 10 torr may be sufficient. In general, the pressure setpoint may be set to any value that permits the required flow through the controllers involved, (e.g., controllers 141–14N, 123, and 129), and this value may vary based upon a variety of factors.

The process controller 110 also provides a split setpoint to the mass flow controller 123 (labeled as MFCX) that is indicative of the amount of process fluid from the manifold 150 that is to be provided to a first input 151 of the process chamber 160. In the embodiment depicted in FIG. 1, the remaining portion of process fluid is provided via the pressure controller 129 to the second input 152 of the process chamber 160. Based upon the signal provided by the pressure transducer 121 and the pressure setpoint provided by the process controller 110, the pressure controller 129 operates to maintain the pressure within the manifold upstream of MFCX 123 and pressure controller 129 at a constant value. Operation of the split ratio controller 120 will now be described.

During a given process step, the process controller 110 provides a process setpoint to one or more of the mass flow controllers 141–14N to flow a desired amount of fluid. The process controller 110 also provides a pressure setpoint value to the pressure controller 129 that is indicative of the desired pressure of fluid within the manifold 150 being provided by one or more of the mass flow controllers 141–14N. The process controller 110 then provides a split setpoint to the mass flow controller 123 (MFCX) that is indicative of the amount of fluid being provided to the common manifold 150 that is desired to be provided to input 151 of the process chamber 160. According to an embodiment of the present invention, the process controller 110 may set the split setpoint according to the following equation, where the mass flow controller 123 (MFCX) is a mass flow controller that has been calibrated on a known process fluid, such as Nitrogen.

$$\text{Split Setpoint Ratio} = K \cdot \sum_{i=1}^{N} S_i \cdot F_i$$

Where:
K is the desired split ratio (0 . . . 1)
$S_i$ is the setpoint to MFCi (e.g., MFCs 141–14N)
$F_i$ is a calibration factor calculated as $F_i = (N_2$ equivalent full-scale range of $MFC_i)/(N_2$ Full-scale range of $MFCX$.)

According to this embodiment, the process controller 110 sets the split setpoint by calculating the total amount of fluid provided to the common manifold 150, in terms of a Nitrogen equivalent, during a given process step, and then multiplying that amount of fluid by the desired split ratio K. It should be appreciated that in this embodiment, the process controller 110 would calculate the desired split setpoint for each process step that provides a different amount of fluid or different types of fluids. It should further be appreciated that if the range of flow of fluid (fluids) that is to be provided to the process chamber is too wide, then mass flow controller MFCX could be replaced with two separate mass flow controllers, one for high rates of flow, and another for lower rates of flow.

Although the manner by which the process controller 110 determines the split setpoint in this embodiment has been described in terms of a Nitrogen equivalent, it should be appreciated that the present invention is not so limited. Thus, the split setpoint may be determined based upon a fluid species other than Nitrogen, provided that the full scale range of each of the mass flow controllers 141–14N and the mass flow controller 123 (MFCX) is known on a particular fluid species, and that each of the mass flow controllers 141–14N and the mass flow controller 123 (MFCX) can reliably operate with the actual fluid species used under the process operating conditions.

It should be appreciated that a number of alterations may be made to the split ratio fluid process control system described above with respect to FIG. 1. For example, rather than using an electronic pressure controller 129, a mechanical pressure regulator could be used instead to control the upstream pressure within the manifold 150. Moreover, in certain environments, pressure transducer 121 could be eliminated, and pressure controller 129 could be replaced with a flow restriction device, such as a nozzle. Accordingly, a myriad of alternative configurations may be used to provide a predetermined amount of fluid to each of the fluid outlets 156 and 157, so long as: 1) at a maximum outlet pressure, and a maximum amount of flow through the pressure controller 129 and a minimum amount of flow through mass flow controller 123, the manifold pressure is low enough for each of the supply MFCs 141–14N to function properly; and 2) at any outlet pressure within the operating range, and a minimum amount of flow through the pressure controller 129 and a maximum amount of flow through mass flow controller 123, the manifold pressure is sufficient for the mass flow controller 123 to function properly and low enough for each of the supply MFCs 141–14N to function properly. Although such alternative configurations would likely have a poorer transient response than the embodiment described with respect to FIG. 1, their reduced cost may be attractive in certain fluid supply systems.

It should be appreciated that although the embodiment of FIG. 1 was described with respect to the flow of a process gas or gases, the present invention is not so limited. Thus, the embodiment of FIG. 1 may be adapted for use with liquids, or with slurries. For example, for use with incompressible fluids, such as liquids, an accumulator may be added upstream of the fluid inlet 155 and a volumetric controller may be used instead of mass flow controller 123. Other modifications necessary for use with incompressible fluids will be readily appreciated by those skilled in the art. Moreover, for use with slurries, those of skill in the art will appreciate that great care will need to be taken in the selection of valves, such that the suspended solids that are present in the slurry do not damage the valve or prevent its proper operation.

According to another embodiment of the present invention, a fluid processing system is provided that dispenses with the need for the process controller 110 to calculate the total amount of fluid, in terms of Nitrogen equivalent, that is provided to the common manifold 150. According to this embodiment, the split ratio fluid process control system includes a split ratio controller having a fluid inlet and a plurality of fluid outlets. The split ratio controller is capable of receiving a flow of process fluid at the fluid inlet and providing a plurality of flows of the process fluid to each of the plurality of fluid outlets. Each of the plurality of flows of the process fluid may have a predetermined ratio relative to the total amount of the process fluid received at the fluid inlet. This embodiment is now described with respect to FIG. 2.

Figure 2:
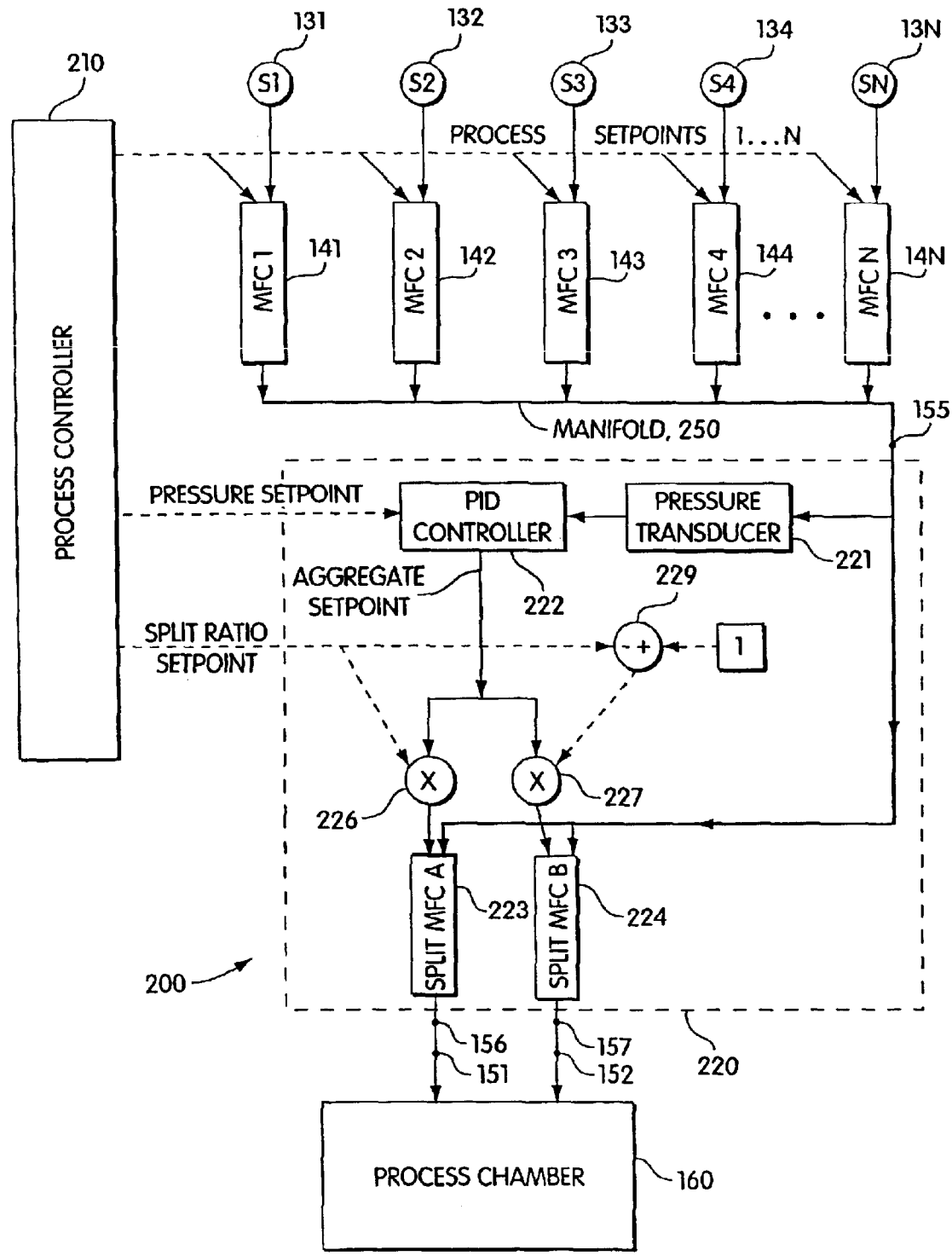
FIG. 2 illustrates a split ratio fluid process control system according to another embodiment of the present invention that is adapted to provide a predetermined flow of process fluid to a pair of fluid outlets.

As in the embodiment described with respect to FIG. 1, fluid processing system 200 depicted in FIG. 2 includes a plurality of fluid supplies 131–13N (labeled S1–SN), each providing a process fluid or mixture of process fluids to a respective mass flow controller (MFC) 141–14N (labeled MFC1–MFCN). Similarly, each mass flow controller 141–14N receives a flow of fluid (or fluids) from its respective fluid supply and a setpoint from a process controller 210. Based upon the setpoint received from the process controller 210, each MFC 141–14N provides a metered amount of fluid to a common manifold 250. As in the embodiment described with respect to FIG. 1, the process controller 210 of FIG. 2 is programmed to control each of the MFCs 141–14N to provide various amounts of one or more of the fluids during each of a number of processing steps in a conventional manner.

Coupled to the common manifold 250 and the process controller 210 is a split ratio controller 220. According to a further embodiment of the present invention, the split ratio controller 220 may include a pressure transducer 221 that is fluidly coupled to the common manifold 250, a first split ratio mass flow controller 223 (labeled as Split MFC A), a second split ratio mass flow controller 224 (labeled as Split MFC B), first and second multipliers 226, 227, a subtraction circuit 229, and a proportional-integral-derivative (PID) controller 222. Preferably first split ratio MFC A 223 and second split ratio MFC B 224 are similar MFCs, tuned to have similar response characteristics, although the full-scale range of these MFCs may differ. For example, if MFC B will be used to provide relatively small portion of the flow of process fluid, then the full-scale range of MFC B may be selected to be less than the full-scale range of MFC A, so that greater accuracy is provided for the range of anticipated flow rates. Further, the first and second split ratio MFCs 223, 224 preferably have their flow sensors disposed downstream of the valve (within each mass flow controller), rather than upstream, so that they are isolated from pressure transients in the common manifold 250. Although controller 222 is described herein as a proportional-integral-derivative (PID) controller, it should be appreciated that the present invention is not so limited. In this regard, many other types of feedback controllers other than a PID controller may be used, such as and Integral-Differential (ID) controller, a Lead-Lag (LL) controller, or a Gain-Lead-Lag (GLL) controller, etc.

As in the embodiment of FIG. 1, pressure transducer 221 provides a signal indicative of the pressure within the common manifold 250. However, in the embodiment of FIG. 2, the pressure signal is provided to the PID controller 222, which also receives a pressure setpoint control signal from the process controller 220 that identifies the desired pressure within the common manifold 250. Typically the pressure setpoint provided by the process controller 210 is a fixed value during a given process step, although it may change from step to step or during a given processing step, as described above with respect to FIG. 1. In general, the pressure setpoint should be set to a value that is within a range in which both the supply MFCs 141–14N and the split ratio MFCs 223 and 224 can operate properly, and preferably near the lower end of this range, to optimize system response characteristics. Based upon the signal from the pressure transducer 221 and the pressure setpoint signal from the process controller 210, the PID controller 222 provides an aggregate setpoint signal to each of the two multipliers 226 and 227.

The process controller 210 provides a split ratio setpoint to the first multiplier 226 and to the subtraction circuit 229. The split ratio setpoint is indicative of the portion or fraction of process fluid within the manifold 250 that is to be provided to a first inlet 151 of the process chamber 160. The split ratio setpoint may be a value between zero and one, inclusive, representing the percentage of the total flow that is desired to be provided to the first input 151. The first multiplier 226 multiplies the aggregate setpoint from the PID controller 222 by the split ratio setpoint to provide a first setpoint signal to the first split ratio MFC A 223. The split ratio setpoint from the process controller 210 is also provided to the subtraction circuit 229, which subtracts the value of the split ratio setpoint from 1 to provide a second split ratio setpoint to the second multiplier 227. The second multiplier 227 multiples the aggregate setpoint from the PID controller 222 by the second split ratio setpoint to provide a second setpoint signal to the second split ratio MFC B 224. Operation of the split ratio controller 220 will now be described.

During a given process step, each MFC 141–14N provides a metered amount of fluid, under control of a respective process setpoint received from the process controller 210. These fluids are mixed in the common manifold 250 connecting the outputs of MFC 141–14N, and the fluid mixture flows into the inlet of the split ratio controller 220. During each process step, the process controller 210 provides an appropriate setpoint to each MFC 141–14N, and a split ratio setpoint (between 0 and 1) to the split ratio controller 220, for the appropriate time. The PID controller 222 produces an aggregate setpoint such that, during a process step, the pressure in the manifold 250 matches the pressure setpoint. The pressure setpoint may be a constant (for example 50 to 100 Torr), or may be provided by the process controller 210 and varied from step to step. The aggregate setpoint from the PID controller 222 reflects the total flow rate into the common manifold 250. That aggregate setpoint is then split based on the split ratio setpoint from the process controller 210. For example, if the aggregate setpoint is 0.6 (60% of "full scale"), and the split ratio is 0.3, first multiplier 226 provides a setpoint of 0.6*0.3 (i.e., 0.18) to the first split ratio MFC A 223, and the second multiplier 227 provides a setpoint of 0.6*(1–0.3) (i.e., 0.42) to the second split ratio MFC B 224, based upon the subtraction performed by subtraction circuit 229. Split ratio MFC A 223 will then flow 18% of full scale, and split ratio MFC B will flow 42% of full scale. Since the split ratio MFCs 223, 224 are substantially identical, split ratio MFC A 223 flows 30% of the total, as requested by the split ratio setpoint, with split ratio MFC B 224 providing the remainder. If the aggregate setpoint were to increase to 0.7, split ratio MFC A 223 would see a setpoint of 0.7*0.3 (i.e., 0.21), and split ratio MFC B 224 would see a setpoint Of 0.7*(1–0.3) (i.e., 0.49), and the total flow through the split ratio MFCs A and B 223, 224 would increase to 70% of full-scale.

The PID controller 222 then servos such that total flow through the split ratio MFCs 223, 224 is precisely equal to the total flow from the supply MFCs 141–14N. If the aggregate setpoint is a bit too low, the manifold pressure, as measured by the pressure transducer 221 will begin to increase, and the PID controller 222 will increase the aggregate setpoint to compensate. If the aggregate setpoint is a bit too high, the manifold pressure will decrease, and the PID controller 222 will decrease the aggregate setpoint to compensate.

It should be appreciated that other split ratio controller configurations may provide improved response. For example, the aggregate setpoint could be calculated as the sum of a setpoint from the process controller 210 and the output of the PID controller 222. This could improve the system's dynamic response by giving the controllers advance notice that the fluid coming into the manifold is changing. However, it could complicate the programming of the process controller 210, by requiring the process controller to calculate a total N2-equivalent flow from the process setpoints being sent to all the process MFCs. It should also be appreciated that the embodiment described above with respect to FIG. 2 may be adapted for use with incompressible fluids, such as liquids, and with slurries.

According to a further embodiment of the present invention, a fluid processing system is provided that includes two or more outlet ports leading to respective inlet ports of a process chamber. For example, an embodiment of a fluid processing system that includes three outlet ports is now described with respect to FIG. 3. As many features of this embodiment are similar to those described above with respect to the embodiment of FIG. 2, only differences between these two embodiments will be explained in detail, during a description of the operation of this further embodiment.

During a given process step, each MFC 141–14N provides a metered amount of fluid, under control of a respective process setpoint received from the process controller 310. These fluids are mixed in the common manifold 350 connecting the outlets of MFC 141–14N, and the fluid mixture flows into an inlet 155 of the split ratio controller 320. During each process step, the process controller 310 provides an appropriate setpoint to each MFC 141–14N, and a plurality of split ratio setpoints to the split ratio controller 320, for the appropriate time. The PID controller 322 produces an aggregate setpoint such that, during a process step, the pressure in the manifold 350 matches a pressure setpoint. The pressure setpoint may be a constant or may be provided by the process controller 310 and varied from step to step. As described previously, the aggregate setpoint from the PID controller 322 reflects the total flow rate into the common manifold 350. That aggregate setpoint is then split based on each of the plurality of split ratio setpoints from the process controller 310. For example, if the aggregate setpoint is 0.6 (60% of "full scale"), and the split ratio provided to split ratio MFC Z is 0.2, the split ratio provided to split ratio MFC B is 0.3, and the split ratio provided to split ratio MFC A is 0.5, the first multiplier 326 provides a setpoint of 0.6*0.2 (i.e., 0.12) to the first split ratio MFC Z 323, the second multiplier 327 provides a setpoint of 0.6*(0.3) (i.e., 0.18) to the second split ratio MFC B 324, and the third multiplier 328 provides a setpoint of 0.6*0.5 (i.e., 0.30) to the third split ratio MFC A 325.

It should be appreciated that the ratio inputs to the multipliers need not even add up to 1. For example, the same 20%:30%:50% split may be obtained by feeding the first split ratio MFC with 40% of the aggregate setpoint, the second with 60% of the aggregate setpoint, and the third with 100% of the aggregate setpoint. The PID controller 222 would ultimately settle out to a different value, but each split ratio MFC would ultimately end up flowing the same amount of fluid as in the previous example.

It should be appreciated that so long as the split ratio setpoints add up to a constant, a subtraction circuit similar to subtraction circuit 229 in FIG. 2 may be used to determine the setpoint of any one of the split ratio MFCs. For example, the split ratio setpoints provided to the first and second multipliers 326 and 327 may first be summed and then provided to the subtraction circuit to provide a split ratio setpoint to multiplier 328. Other configurations may also be considered.

Although the split ratio controller 320 described above with respect to FIG. 3 was described as having three outlet ports, it should be appreciated that it may be readily extended to systems having more than three fluid outlet ports. Indeed, as long as the desired split ratio may be decomposed into multiple values in the proper ratios, and each of those values are multiplied by the composite (aggregate) setpoint, additional fluid outlet ports may be accommodated.

Figure 3:
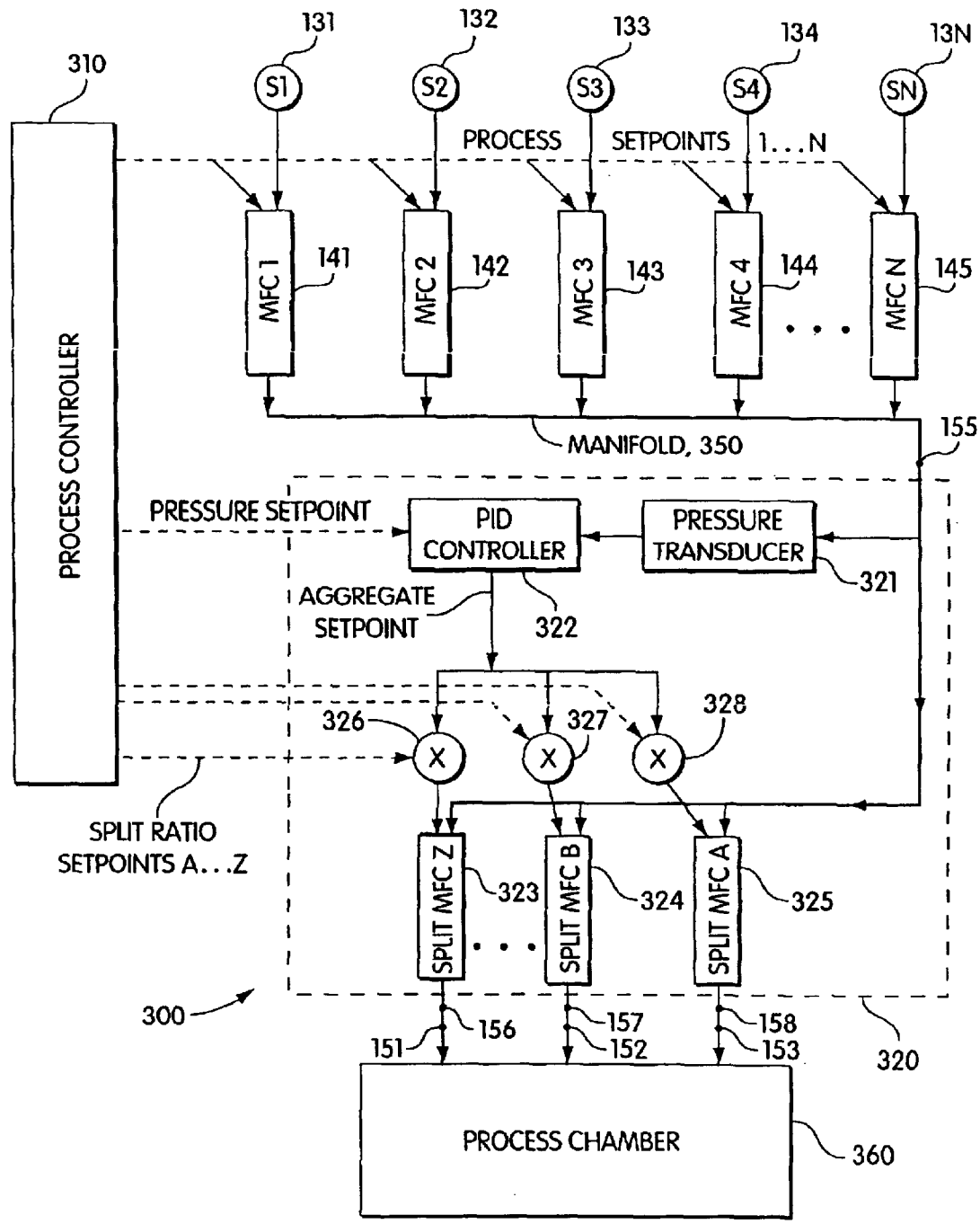
FIG. 3 illustrates a split ratio fluid process control system according to yet another embodiment of the present invention that is adapted to provide a predetermined flow of process fluid to more than two fluid outlets.

It should be appreciated that distinguishing aspects of the split ratio controller of FIGS. 2 and 3 may include that each output port has its own split ratio MFC, the setpoints to the split ratio MFCs are at the proper ratio relative to each other, and that the setpoints to all split ratio MFCs servo together to maintain a desired manifold pressure.

According to another embodiment of the present invention, a fluid processing system is provided that includes a split ratio controller that dispenses with the use of one or more mass flow controllers therein. This further embodiment is now described with respect to FIG. 4.

Figure 4:
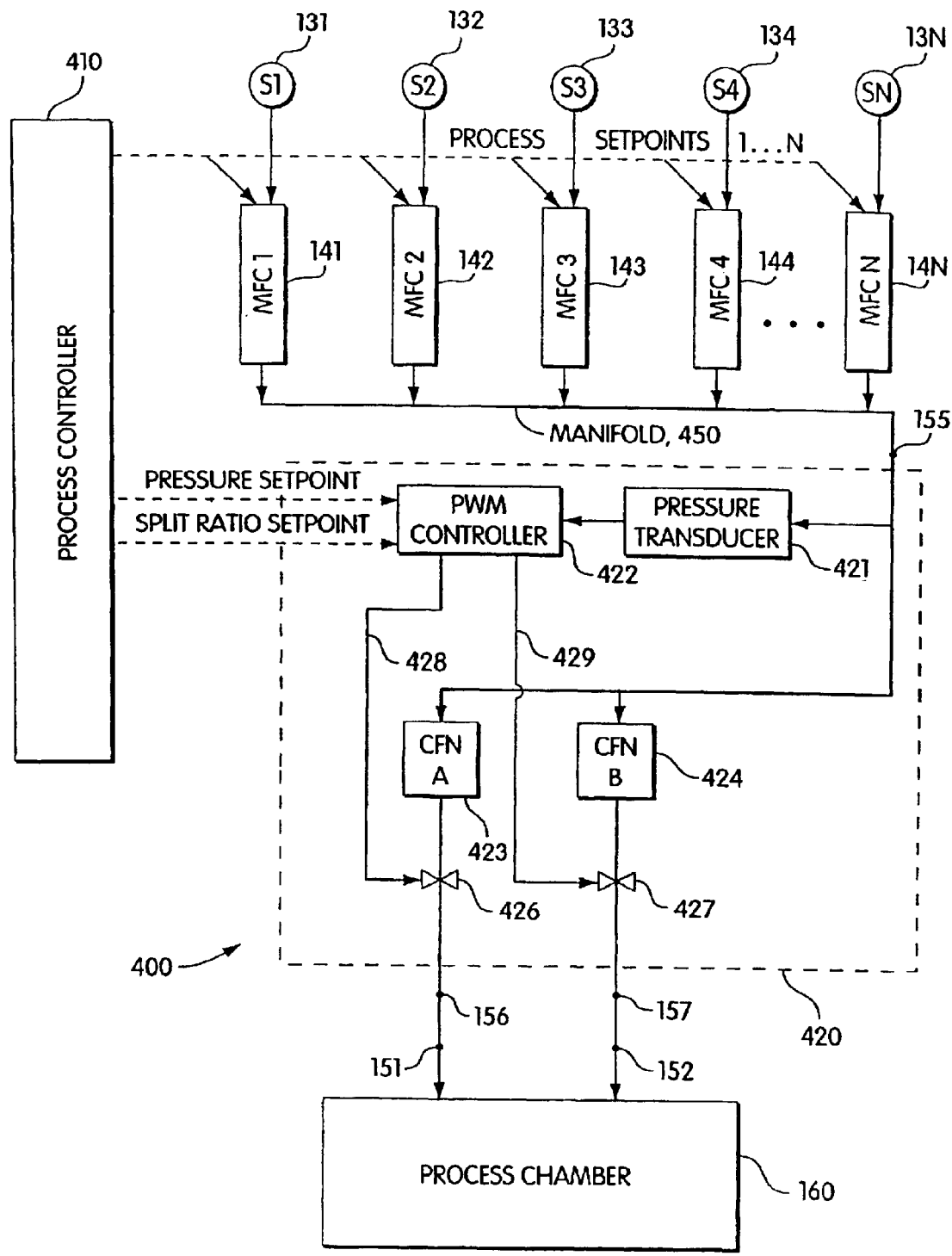
FIG. 4 illustrates a split ratio fluid process control system according to yet another embodiment of the present invention that utilizes critical flow nozzles and provides a predetermined flow of process fluid to a pair of fluid outlets.

As in the embodiments described with respect to FIGS. 1–3, fluid processing system 400 depicted in FIG. 4 includes a plurality of fluid supplies 131–13N (labeled S1–SN), each providing a process fluid or mixture of process fluids to a respective mass flow controller (MFC) 141–14N (labeled MFC1–MFCN). Similarly, each mass flow controller 141–14N receives a flow of fluid (or fluids) from its respective fluid supply and a setpoint from a process controller 410. Based upon the setpoint received from the process controller 410, each MFC 141–14N provides a metered amount of fluid to a common manifold 450. As in the embodiments described with respect to FIGS. 1–3, the process controller 410 of FIG. 4 is programmed to control each of the MFCs 141–14N to provide various amounts of one or more of the fluids during each of a number of processing steps in a conventional manner.

Coupled to the common manifold 450 and the process controller 410 is a split ratio controller 420. According to a further embodiment of the present invention, the split ratio controller 420 may include a pressure transducer 421 that is fluidly coupled to the common manifold 450, a pulse width modulation (PWM) controller 422, a first critical flow nozzle (CFN) 423 (CFN A), a second critical flow nozzle 424 (CFN B), and first and second control valves 426 and 427 located downstream of each of the first and second critical flow nozzles 423, 424. Preferably, each of the control valves 426 and 427 are digital control valves. The first and second critical flow nozzles 423, 424 are preferably substantially identical and are fluidly coupled to the common manifold 450. Provided that a pressure ratio of approximately 2:1 is maintained across each of the critical flow nozzles 423, 424, the flow through each of the critical flow nozzles will be substantially identical and may be controlled by modulating the amount of time each of the valves 426 and 427 is in an open state. The open state of each of the valves 426 and 427 may be controlled based upon the frequency that each valve is opened, the duration of time that each valve is opened, or both.

As shown in FIG. 4, the flow through each of the critical flow nozzles 423, 424 is controlled via control valves 426 and 427, respectively. Each of control valves 426, 427 respectively receives a pulse width modulated control signal 428, 429 from the PWM controller 422 that controls the duration (width or W) and the frequency (pulse or P) of the opening of the valves 426, 427. The frequency (P) and duration (W) of each of the valves is determined by two factors: the upstream pressure as indicated by the pressure transducer 421 and set via the pressure setpoint from the process controller 410, and the desired split ratio setpoint signal provided by the process controller 410. According to one embodiment, the duration (W) of each of the valves 426 and 427 may be the same, with the frequency being adjusted to provide the desired ratio of fluid to each of the outlets 156 and 157. For example, if one desired a 40/60 split ratio between outlet 156 and outlet 157, then the frequency of valve 427 would be the frequency of valve 426 times 60 divided by 40 (i.e., 1.5 times the frequency of valve 426). The duration (W) of the on state of both valves 426 and 427 would be determined based upon the upstream pressure. The duration would increase or decrease to maintain the desired upstream pressure. Alternatively, the frequency of the control signals 428, 429 provided to each of the valves 426, 427 may be the same, and the duration (W) adjusted to provide the desired ratio of fluid. Moreover, it should be appreciated that both the duration (W) and the frequency (P) may be adjusted to provide the desired ratio of fluid to each of the outlets.

Although the first and second critical flow nozzles 423 and 424 have been described as being substantially identical to one another it should be appreciated that some differences will inevitably exist. However, each of the critical flow nozzles may be characterized and the PWM controller 422 programmed to apply a correction algorithm to make them identical. For example, the frequencies (or the duration) of the control signals 428 and 429 could be slightly adjusted based upon a characterization of the critical flow nozzles. Thus, although the critical flow nozzles are preferably substantially identical, the present invention is not so limited.

Figure 5:
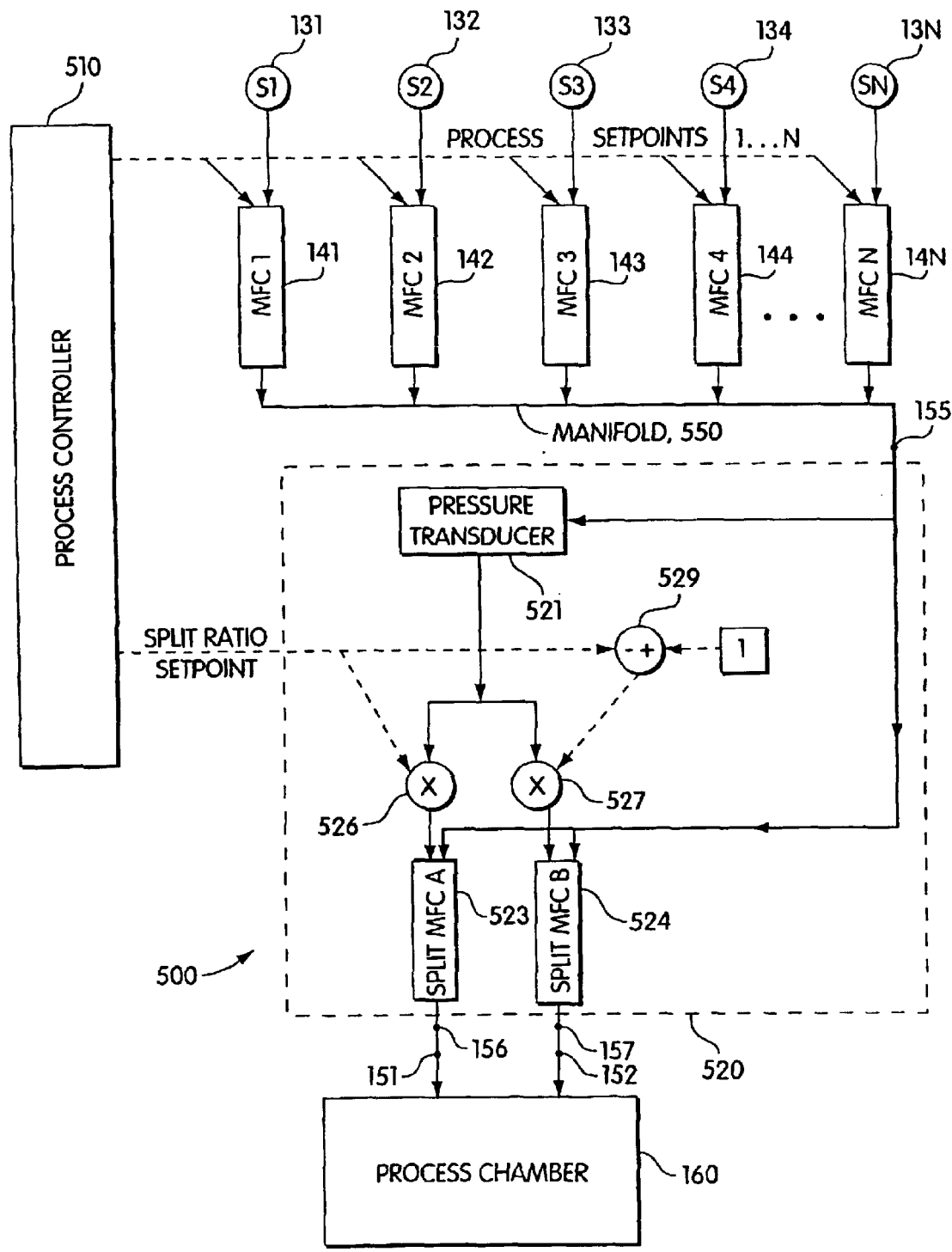
FIG. 5 illustrates a split ratio fluid process control system according to yet another embodiment of the present invention that is similar to the embodiment of FIG. 2 and which does not include a PID controller.
Figure 6:
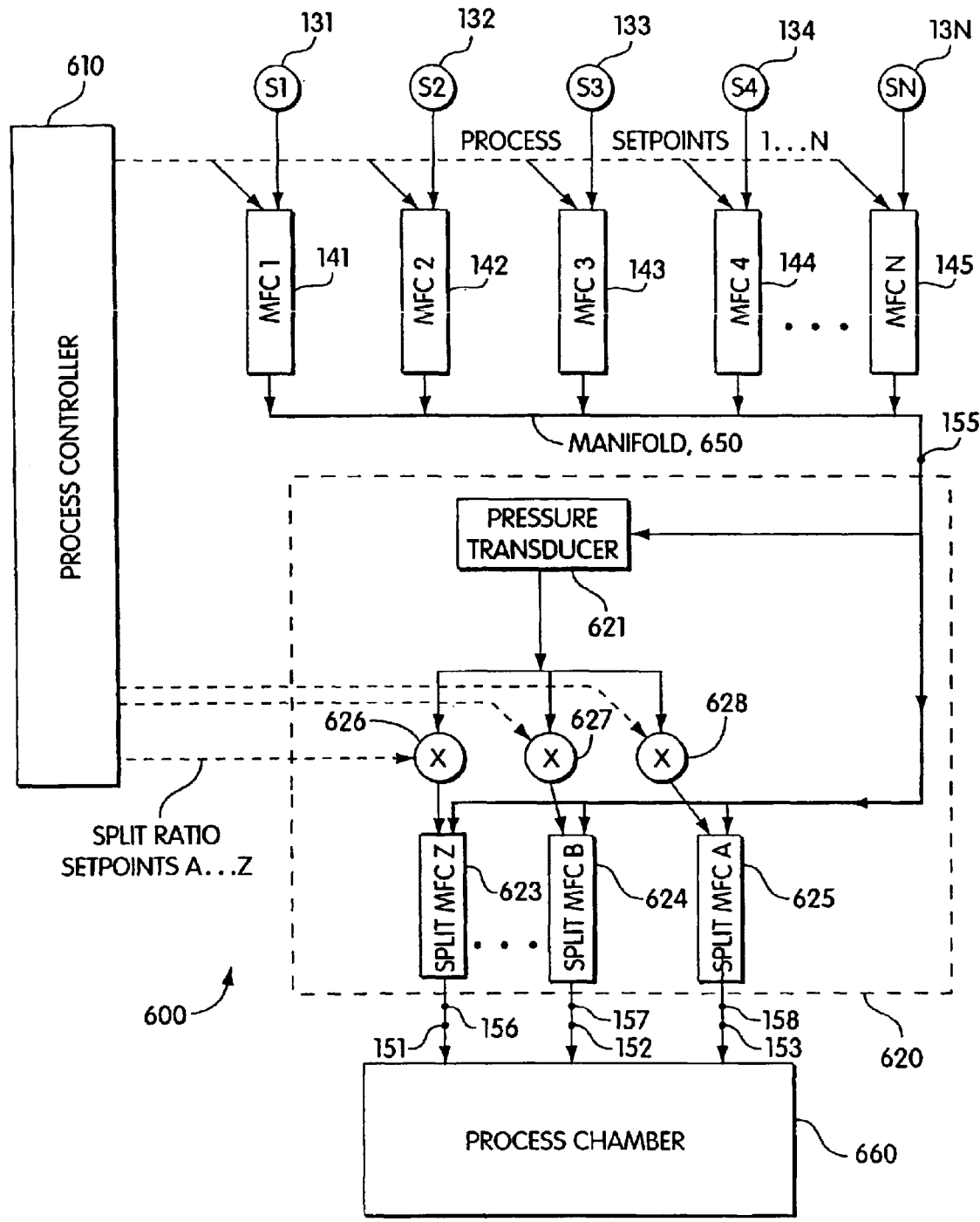
FIG. 6 illustrates a split ratio fluid process control system according to yet another embodiment of the present invention that is similar to the embodiment of FIG. 3 and which does not include a PID controller.

FIGS. 5 and 6 illustrate alternative embodiments of the present invention, that are similar to the embodiments described above with respect to FIGS. 2 and 3, respectively, but in which the PID controller 222, 322 is omitted. As will be appreciated by those skilled in the art, the omission of the PID controllers 222, 322 is functionally equivalent to providing a PID controller having a proportional gain (P) of unity (1), Integral (I) and differential (D) gains of zero (0), and providing a pressure setpoint of zero (0) from the process controller.

In each of the embodiments of FIGS. 5 and 6, a pressure transducer 521, 621, provides a signal indicative of the pressure within the common manifold 550, 650 to each of multipliers 526 and 527 (FIG. 5), and 626, 627, 628 (FIG. 6). In the embodiment of FIG. 5, the process controller 510 provides a split ratio setpoint to the first multiplier 526 and to a subtraction circuit 529. As in the embodiment of FIG. 2, the split ratio setpoint is indicative of the portion or fraction of process fluid within the manifold 550 that is to be provided to a first inlet 151 of the process chamber 160. The split ratio setpoint may be a value between zero and one, inclusive, representing the percentage of the total flow that is desired to be provided to the first input 151. The first multiplier 526 multiplies the split ratio setpoint by the signal indicative of the pressure within the common manifold 550 to provide a first setpoint signal to a first split ratio MFC A 523. The split ratio setpoint from the process controller 510 is also provided to the subtraction circuit 529, which subtracts the value of the split ratio setpoint from 1 to provide a second split ratio setpoint to the second multiplier 527. The second multiplier 527 multiples the second split ratio setpoint by the signal indicative of the pressure within the common manifold 550 to provide a second setpoint signal to the second split ratio MFC B 524.

In the embodiment of FIG. 6, the process controller 610 provides a plurality of split ratio setpoints to the split ratio controller 620 for the appropriate time. Each of these split ratio setpoints is provided to a respective multiplier 626, 627, 628, which receives the respective split ratio setpoint and multiplies the respective split ratio setpoint by the signal indicative of the pressure within the common manifold 650 received from the pressure transducer 621. Each of the multipliers 626, 627, 628 then provides a respective setpoint signal to a respective split ratio MFC 623, 624, 625 that reflects the desired ratio of fluid that is to be provided by the respective split ratio MFC.

According to another embodiment of the present invention, a fluid processing system is provided that dispenses with the need for a pressure sensor. According to this embodiment, the split ratio fluid process control system includes a split ratio controller having a proportional diverter valve controllable to divide the flow of process fluid between two fluid outlets, a pair of flow meters to measure the flow of process fluid through each fluid outlet, and a control system to control the ratio of the flow of process fluid between the two fluid outlets. This embodiment is now described with respect to FIG. 7.

Figure 7:
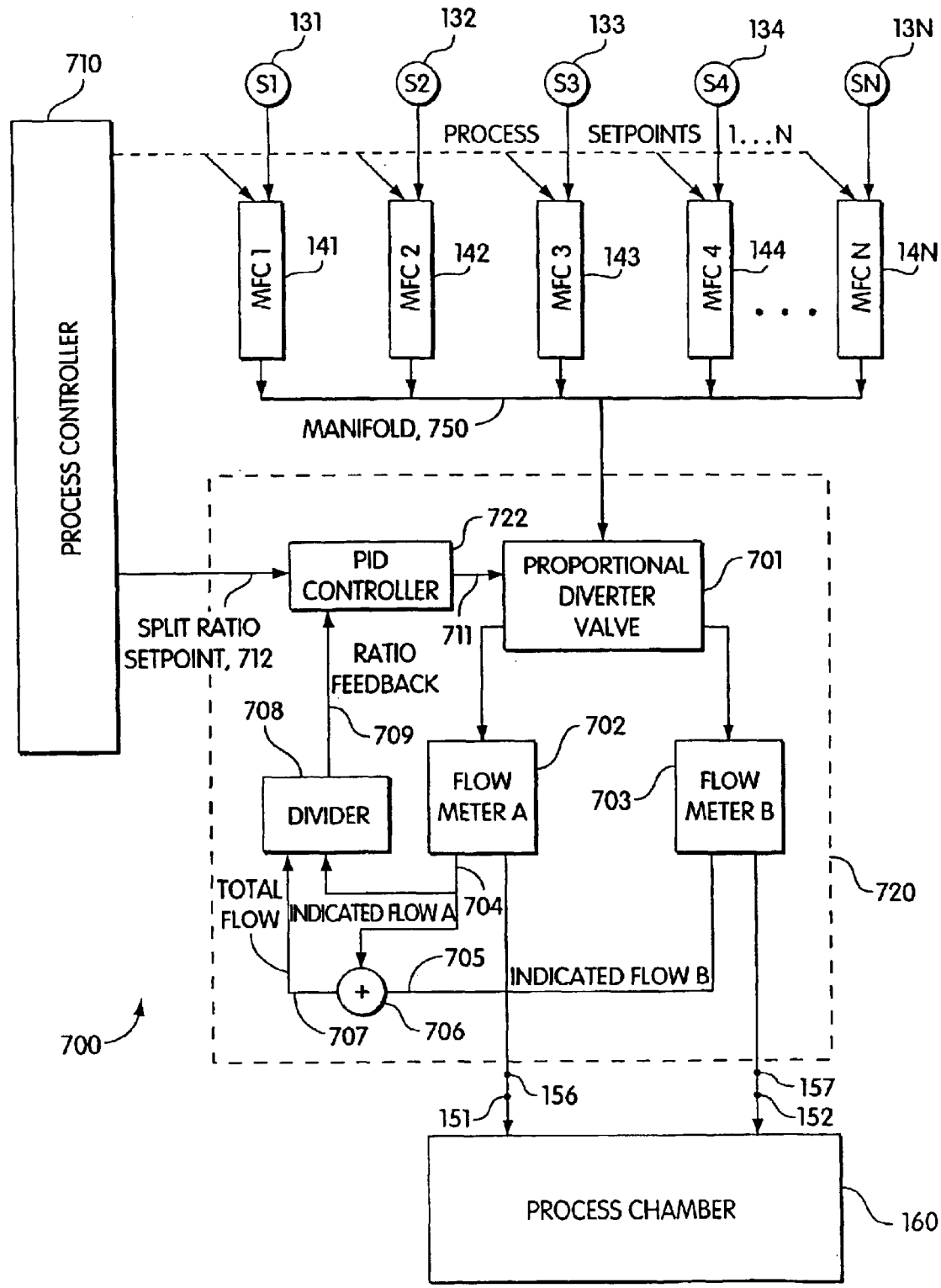
FIG. 7 illustrates a split ratio fluid process control system according to yet another embodiment of the present invention that utilizes a proportional diverter valve.

As in the embodiment described with respect to FIG. 1, fluid processing system 700 depicted in FIG. 7 includes a plurality of fluid supplies 131–13N (labeled S1–SN), each providing a process fluid or mixture of process fluids to a respective mass flow controller (MFC) 141–14N (labeled MFC1–MFCN). Similarly, each mass flow controller 141–14N receives a flow of fluid (or fluids) from its respective fluid supply and a setpoint from a process controller 710, and each MFC 141–14N provides a metered amount of fluid to a common manifold 750. As in the embodiment described with respect to FIG. 1, the process controller 710 of FIG. 7 is programmed to control each of the MFCs 141–14N to provide various amounts of one or more of the fluids during each of a number of processing steps in a conventional manner.

Coupled to the common manifold 750 and the process controller 710 is a split ratio controller 720. According to a further embodiment of the present invention, the split ratio controller 720 may include a proportional diverter valve 701 that is fluidly coupled to the common manifold 750, a first flow meter 702 (labeled as Flow Meter A), a second flow meter 703 (labeled as Flow Meter B), an adder 706, a divider 708, and a controller 722. Preferably first flow meter A 702 and second flow meter B 703 are similar flow meters, tuned to have similar response characteristics. Although controller 722 is described herein as a proportional-integral-derivative (PID) controller, it should be appreciated that the present invention is not so limited. In this regard, many other types of feedback controllers other than a PID controller may be used, such as a Lead-Lag (LL) controller or a Gain-Lead-Lag (GLL) controller, etc.

The proportional diverter valve 701 is an always-open valve that divides its inlet flow selectively between 2 outlets, under control of valve drive signal 711. Either outlet may be closed off, but only one outlet can be closed at a time. It should be appreciated that a variety of different types of valves may be used for this purpose, such as a disc valve, a ball valve, a cartridge valve, a solenoid controlled valve, etc., as the present invention is not limited to any particular type of valve.

One outlet of proportional diverter valve 701 is fluidly coupled to the inlet of flow meter A 702, and the other outlet is fluidly coupled to the inlet of flow meter B 703. Flow meter A provides an indicated flow A output signal 704 that is connected to a first input of adder 706 and a first input of divider 708. Flow meter B provides an indicated flow B output signal 705 that is connected to a second input of adder 706. Adder 706 provides a total flow signal 707 that is connected to a second input of divider 708. Divider 708 calculates a ratio feedback signal 709 (i.e., indicated flow A/(indicated flow A + indicated flow B)) that is connected to a feedback input of PID controller 722. The process controller 710 provides a split ratio setpoint signal 712 to a setpoint input of PID controller 722. Based upon these signals, PID controller 722 provides a valve drive signal 711 that controls the fluid split provided by the proportional diverter valve 701. Operation of the split ratio controller 720 will now be described.

During a given process step, each MFC 141–14N provides a metered amount of fluid, under control of a respective process setpoint received from the process controller 710. These fluids are mixed in the common manifold 750 connecting the outputs of MFC 141–14N, and the fluid mixture flows into the inlet 155 of the split ratio controller 720. During each process step, the process controller 710 provides an appropriate setpoint to each MFC 141–14N, and a split ratio setpoint (between 0 and 1) to the split ratio controller 720, for the appropriate time. The proportional diverter valve 701 divides the inlet fluid flow from manifold 750 between its two outlets, under control of valve drive signal 711. It should be appreciated that immediately following a setpoint, flow, or fluid species change, the split provided by valve 701 may not precisely match the split requested by the process controller 710.

Flow meter A 702 and flow meter B 703 measure the actual flow of process fluid from each of the two outlets of the proportional diverter valve 701, and provide indicated flow signals A and B 704, 705. It should be appreciated that these flow signals are representative of the flow of process fluid provided to each fluid input of the process chamber 160. The adder 706 calculates total flow 707 through split ratio controller 720 by summing indicated flow signals A and B 704, 705. Divider 708 calculates the ratio feedback signal 709 by dividing indicated flow signal A 704 by the total flow signal 707. PID controller 722 compares the split ratio setpoint signal 712 with the ratio feedback signal 709 and servos, adjusting valve drive signal 711, such that the ratio feedback signal 709 is equal to the split ratio setpoint signal 712. If the ratio feedback signal 709 is a bit too low, the PID controller 722 will increase the valve drive signal 711 to compensate. Similarly, if the ratio feedback signal 709 is a bit too high, the PID controller 722 will decrease the valve drive signal 711 to compensate.

It should be appreciated that a number of modifications may be made to the embodiment described above with respect to FIG. 7. For example, although the split ratio controller 720 described above with respect to FIG. 7 included a divider 708 that determined a ratio feedback signal 709 based upon the indicated flow signal A divided by the sum of the indicated flow signals A and B, and the PID controller 712 compared the ratio feedback signal 709 to the split ratio setpoint signal 712, similar functionality could be provided with a multiplier. For example, divider A could be substituted with a multiplier that calculates a flow setpoint based upon the split ratio setpoint signal 712 multiplied by the total flow signal 707. The PID controller 722 could then compare the desired flow signal A with this alternative flow setpoint signal to provide similar functionality. Alternatively, rather than the proportional diverter valve 701 being connected so that an increase in the valve drive signal 711 leads to an increase in flow through flow meter 702, and a decrease in flow through flow meter 703, the valve 701 may be connected in the opposite manner, and the valve drive signal 711 inverted to compensate.

Having thus described at least one illustrative embodiment of the invention, various alterations, modifications, and improvements will readily occur to those skilled in the art. Such alterations, modifications, and improvements are intended to be within the scope of the invention. Accordingly, the foregoing description is by way of example only and is not intended as limiting. The invention is limited only as defined in the following claims and the equivalents thereto.

What is claimed is:

1. A fluid flow control system, comprising:
    a fluid inlet to receive a flow of process fluid;
    a pressure transducer to measure a pressure of the process fluid received at the fluid inlet and provide a pressure signal indicative of an amount of the process fluid received at the fluid inlet;
    a plurality of fluid outlets, the plurality of fluid outlets including a first fluid outlet and at least one second fluid outlet;
    a first controlled valve operatively coupled to the first fluid outlet, to receive a first control signal that is based upon the pressure signal, and responsive to the first control signal, to provide a first predetermined portion of the flow of process fluid received at the fluid inlet to the first fluid outlet;
    at least one second controlled valve operatively coupled to the at least one second fluid outlet, to receive at least one second control signal that is based upon the pressure signal, and responsive to the at least one second control signal, to provide a remaining portion of the flow of process fluid received at the fluid inlet to the at least one second fluid outlet;
    wherein a ratio of the first predetermined portion to the remaining portion is independent of the amount of process fluid received at the fluid inlet.

2. A fluid control system, comprising:
    a fluid inlet to receive a flow of process fluid;
    a plurality of fluid outlets, the plurality of fluid outlets including a first fluid outlet and at least one second fluid outlet, the first fluid outlet providing a first predetermined portion of the flow of process fluid, and the at least one second fluid outlet providing a remaining portion of the flaw of process fluid;
    a pressure transducer, to measure a pressure of the process fluid in the fluid inlet and provide a pressure signal indicative of the pressure of the process fluid;
    a pulse width modulated controller to receive the pressure signal, a pressure setpoint indicative of a desired pressure of the process fluid in the fluid inlet, and a first setpoint indicative of the first predetermined portion of the flow of process fluid to be provided by the first fluid outlet, the pulse width modulated controller providing first and second pulse width modulated control signals;
    a first critical flow nozzle, fluidly coupled to the fluid inlet, to receive the flow of process fluid and reduce the pressure of the process fluid;
    a second critical flow nozzle, fluidly coupled to the fluid inlet, to receive the flow of process fluid and reduce the pressure of the process fluid;
    a first control valve, fluidly coupled to the first critical flow nozzle and the first fluid outlet, to receive the first pulse width modulated control signal and provide the first predetermined portion of the flow of process fluid to the first fluid outlet based upon the first pulse width modulated control signal; and
    a second control valve, fluidly coupled to the second critical flow nozzle and the at least one second fluid outlet, to receive the second pulse width modulated control signal and provide the remaining portion of the flow of process fluid to the at least one second fluid outlet based upon the second pulse width modulated control signal.

3. The fluid flow control system of claim 2, wherein the first and second critical flow nozzles are substantially identical.

4. The fluid flow control system of claim 2, wherein the first and second critical flow nozzles reduce the pressure of the process fluid by approximately a two to one ratio.

5. The fluid flow control system of claim 2, wherein the first and second control valves are digital control valves.

6. The fluid flow control system of claim 2, wherein at least one of a frequency and a duration of the first and second pulse width modulated control signals is modulated based upon the pressure signal, the pressure setpoint, and the first setpoint.

7. The fluid flow control system of claim 6, wherein at least one of the frequency and the duration of one of the first and second pulse width modulated control signals is further modulated to make performance of the first and second critical flow nozzles substantially identical.

8. The fluid flow control system of claim 2, wherein:
    the first and second critical flow nozzles reduce the pressure of the process fluid by a two to one ratio;
    the first and second control valves are digital control valves;
    at least one of a frequency and a duration of the first and second pulse width modulated control signals is modulated based upon the pressure signal, the pressure setpoint, and the first setpoint; and
    wherein at least one of the frequency and the duration of one of the first and second pulse width modulated control signals is further modulated to make performance of the first and second critical flow nozzles substantially identical.

9. The fluid flow control system of claim 1, wherein the plurality of fluid outlets are fluidly connected to a semiconductor wafer processing chamber.

10. The fluid flow control system of claim 1, wherein the process fluid is a gaseous process fluid.

11. A method of controlling a flow of process fluid, comprising acts of:
    receiving the flow of process fluid at a fluid inlet;
    measuring a pressure of the process fluid received at the fluid inlet;
    providing a first predetermined portion of the flow of process fluid received at the fluid inlet to a first fluid outlet;
    providing a remaining portion of the flow of process fluid received at the fluid inlet to at least one second fluid outlet; and
    maintaining, responsive to the act of measuring, a fixed ratio between the first predetermined portion of the flow of process fluid received at the fluid inlet and provided to the first fluid outlet and the remaining portion of the flow of process fluid received at the fluid inlet and provided to the at least one second fluid outlet, the fixed ratio being independent of an amount of fluid received at the fluid inlet.

12. A method of controlling a flow of process fluid, comprising acts of:
    receiving the flaw of process fluid at a fluid inlet;
    providing a first predetermined portion of the flow of process fluid to a first fluid outlet; and
    providing a remaining portion of the flow of process fluid to at least one second fluid outlet; the method further comprising acts of:
    measuring a pressure of the process fluid in the fluid inlet;
    receiving a pressure setpoint indicative of a desired pressure of the process fluid in the fluid inlet;
    receiving a first setpoint indicative of the first portion of the flow of process fluid to be provided to the first fluid outlet;

generating a first pulse width modulated control signal based upon the pressure of the process fluid in the fluid inlet, the pressure setpoint, and the first setpoint; and controlling a first valve to provide the first predetermined portion of the flow of process fluid to the first outlet based upon the first pulse width modulated control signal.

13. The method of claim 12, further comprising acts of:

generating a second pulse width modulated control signal based upon the pressure of the process fluid in the fluid inlet, the pressure setpoint, and the first setpoint; and controlling a second valve to provide the remaining portion of the flow of process fluid to the at least one second fluid outlet based upon the second pulse width modulated control signal.

14. The method of claim 13, further comprising an act of:

reducing the pressure of the process fluid prior to providing the flow of process fluid to the first and second valves.

15. The method of claim 14, wherein the act of reducing the pressure includes an act of reducing the pressure of the process fluid by approximately a two to one ratio.

16. The method of claim 14, further comprising an act of:

modulating at least one of a frequency and a duration of the first and second pulse width modulated control signals based upon the pressure signal, the pressure setpoint, and the first setpoint.

17. The method of claim 16, wherein the act of reducing the pressure is performed by first and second critical flow nozzles respectively disposed upstream of the first and second valves, and wherein the act of modulating further includes an act of further modulating at least one of the frequency and the duration of one of the first and second pulse width modulated control signals make performance of the first and second critical flow nozzles substantially identical.

* * * * *

UNITED STATES PATENT AND TRADEMARK OFFICE
CERTIFICATE OF CORRECTION

PATENT NO. : 6,941,965 B2
DATED : September 13, 2005
INVENTOR(S) : John M. Lull and William S. Valentine It is certified that error appears in the above-identified patent and that said Letters Patent is hereby corrected as shown below:

<u>Title page,</u>
Item [62], Related U.S. Application Data, replace with the following:
-- Continuation of application No. 10/154,433, filed on May 23, 2002, now Pat. No. 6,752,166. --.

Signed and Sealed this

Eighth Day of November, 2005

JON W. DUDAS
*Director of the United States Patent and Trademark Office*